April 21, 1931. F. R. MOULTON 1,801,969
METHOD OF AND APPARATUS FOR KINETOSCOPY
Filed Jan. 7, 1920 5 Sheets-Sheet 1
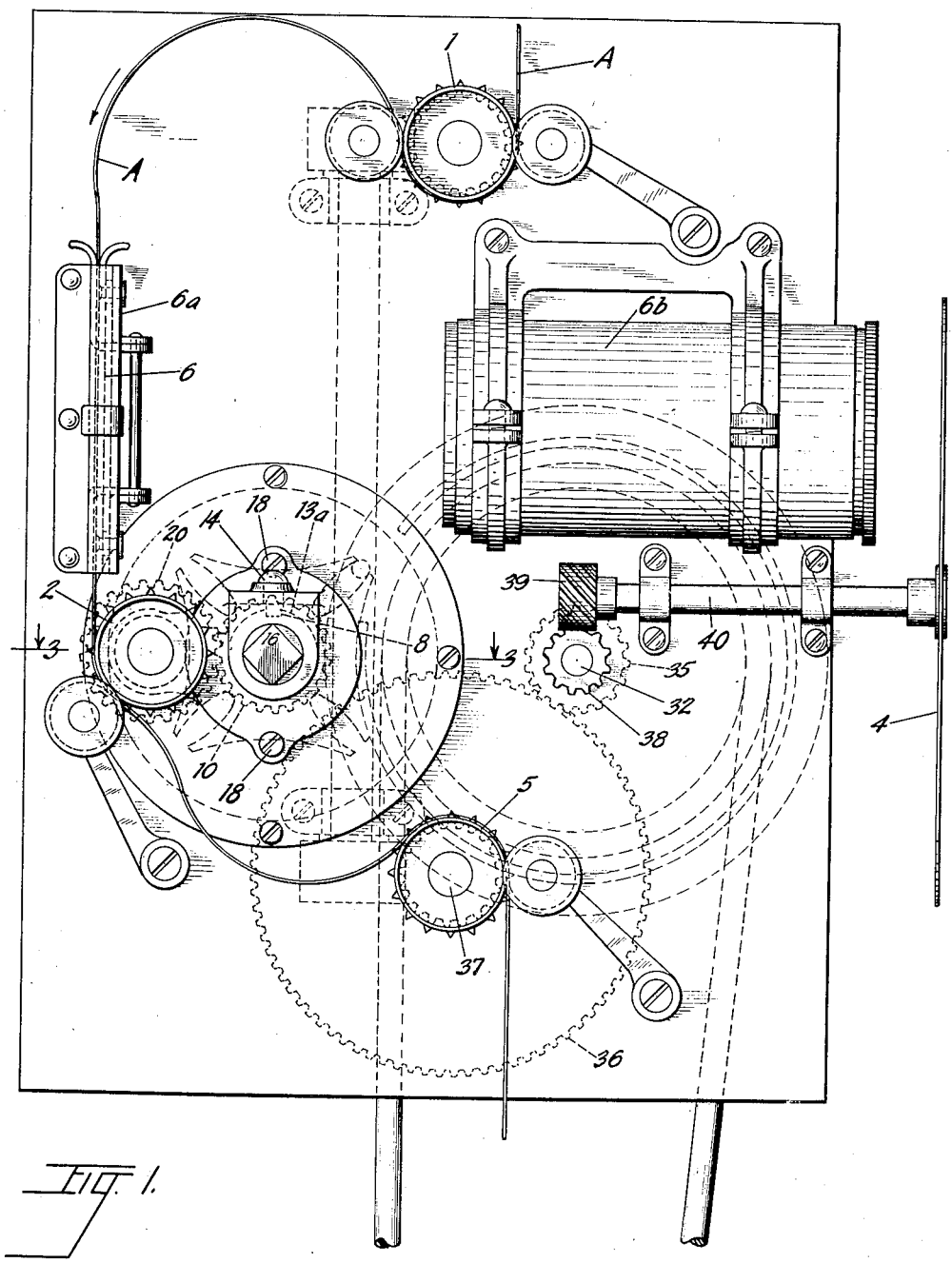
INVENTOR
Forest Ray Moulton
BY
ATTORNEY

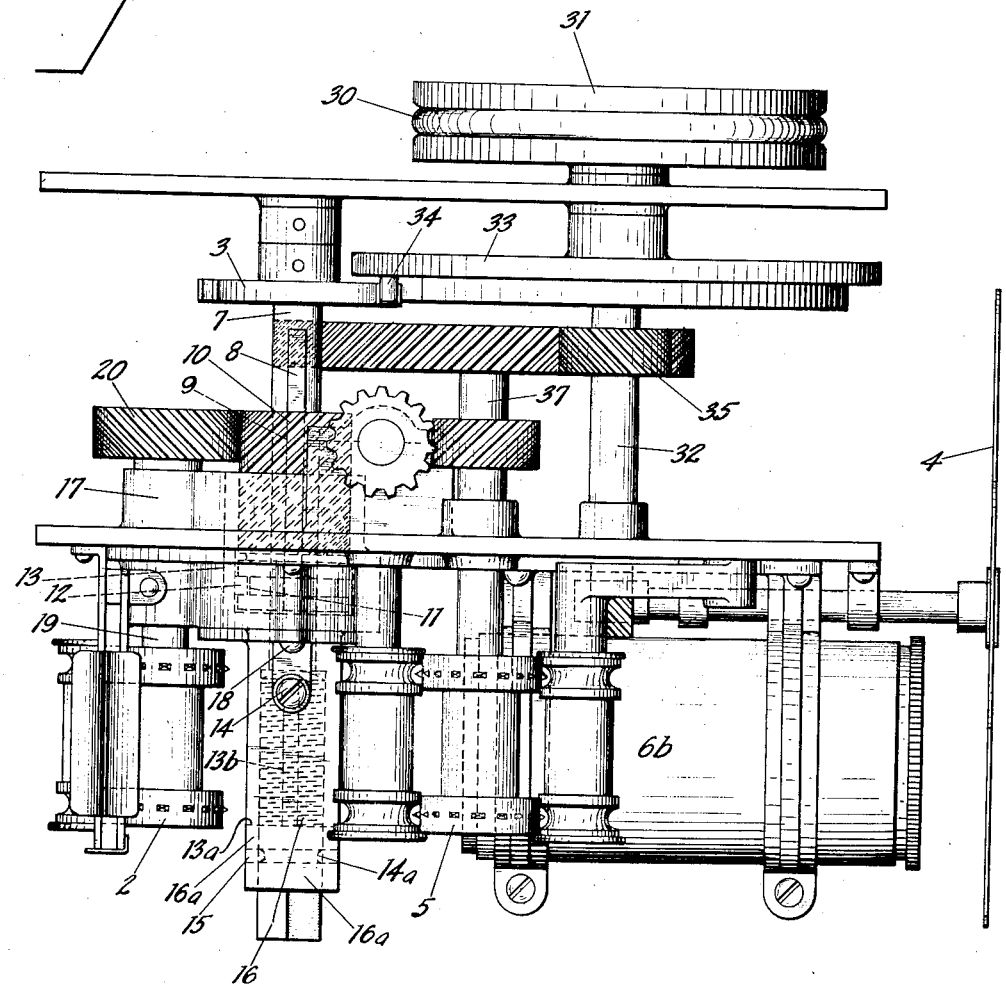

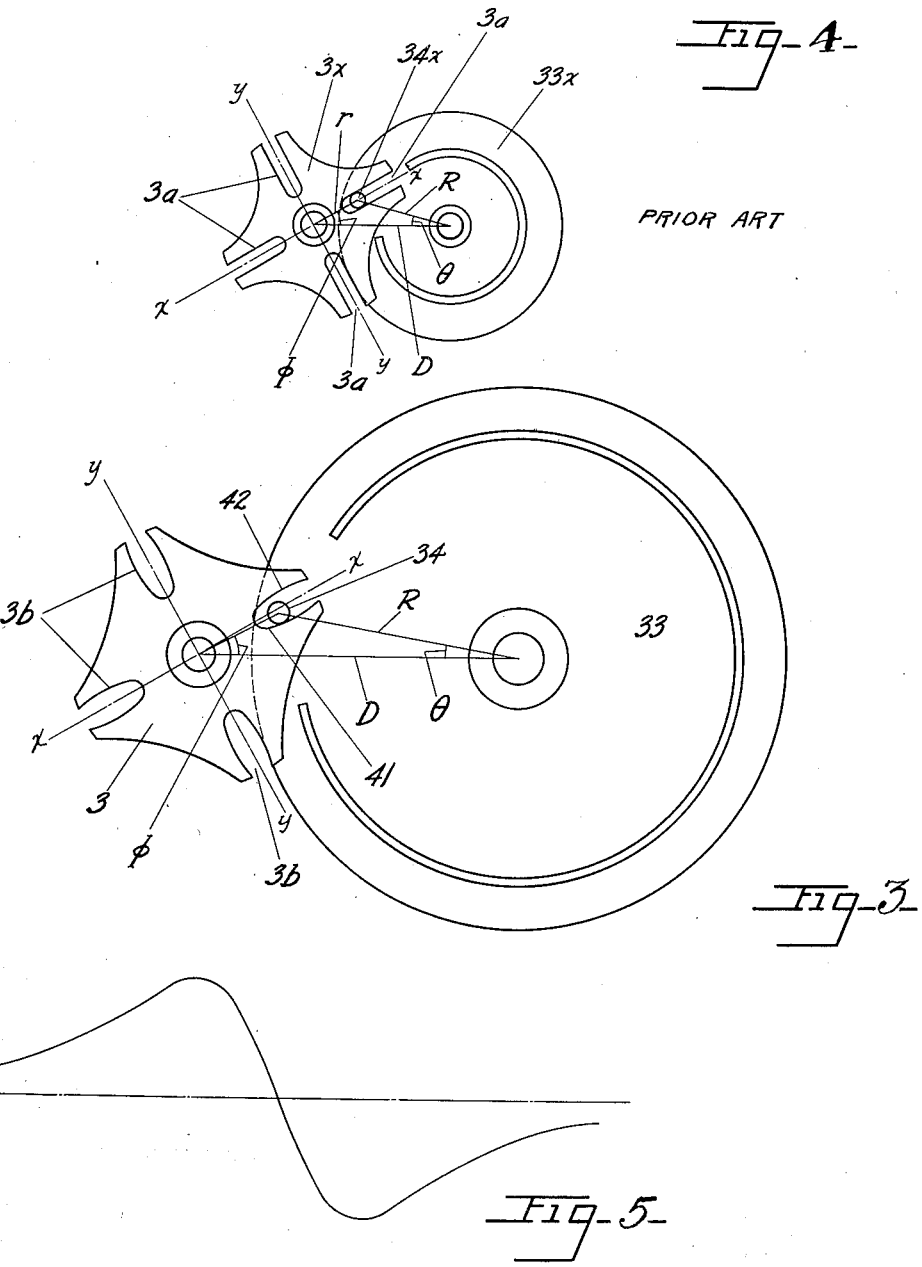

April 21, 1931.   F. R. MOULTON   1,801,969
METHOD OF AND APPARATUS FOR KINETOSCOPY
Filed Jan. 7, 1920   5 Sheets-Sheet 4
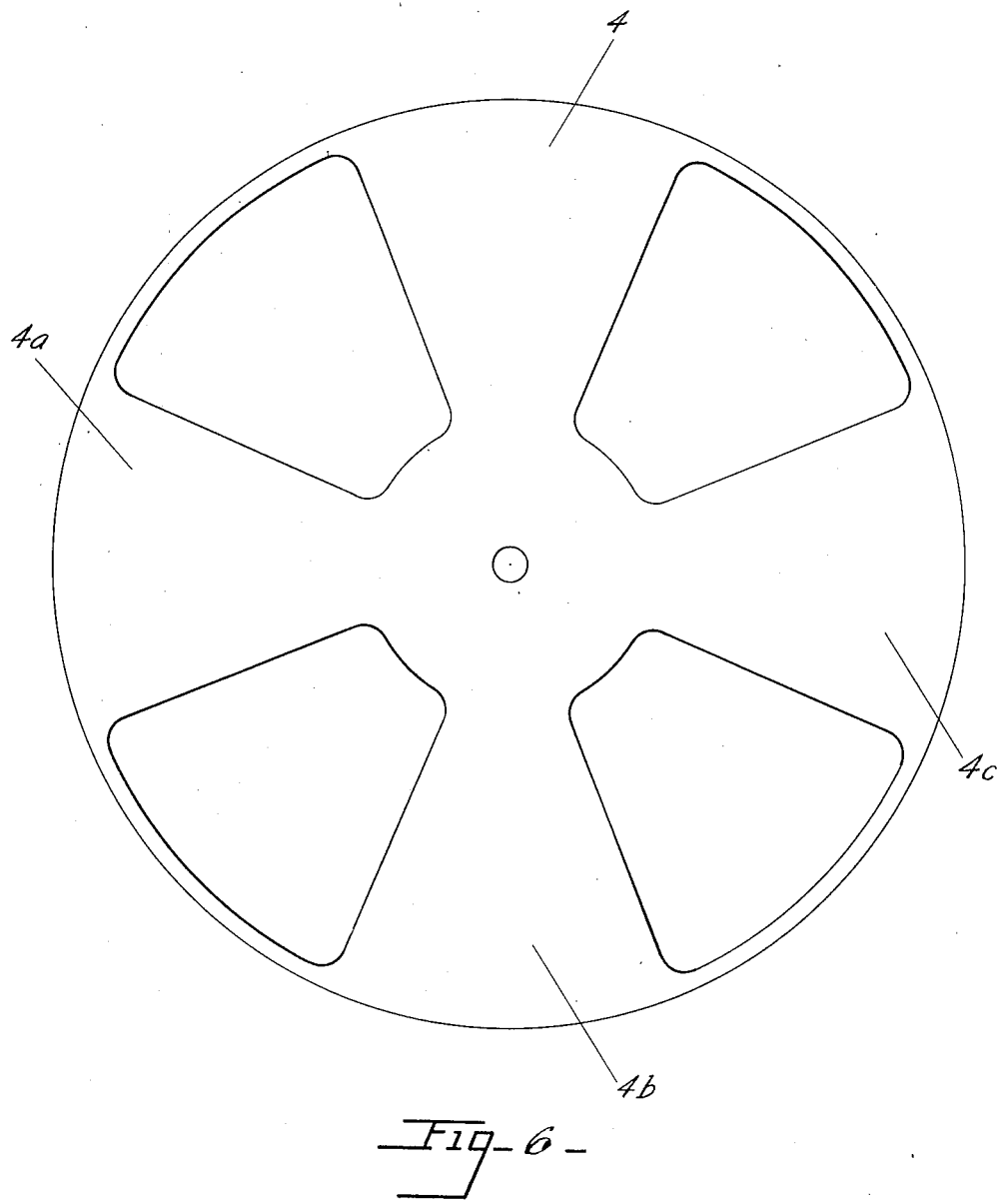
Fig-6-
INVENTOR
Forest Ray Moulton
BY
ATTORNEY

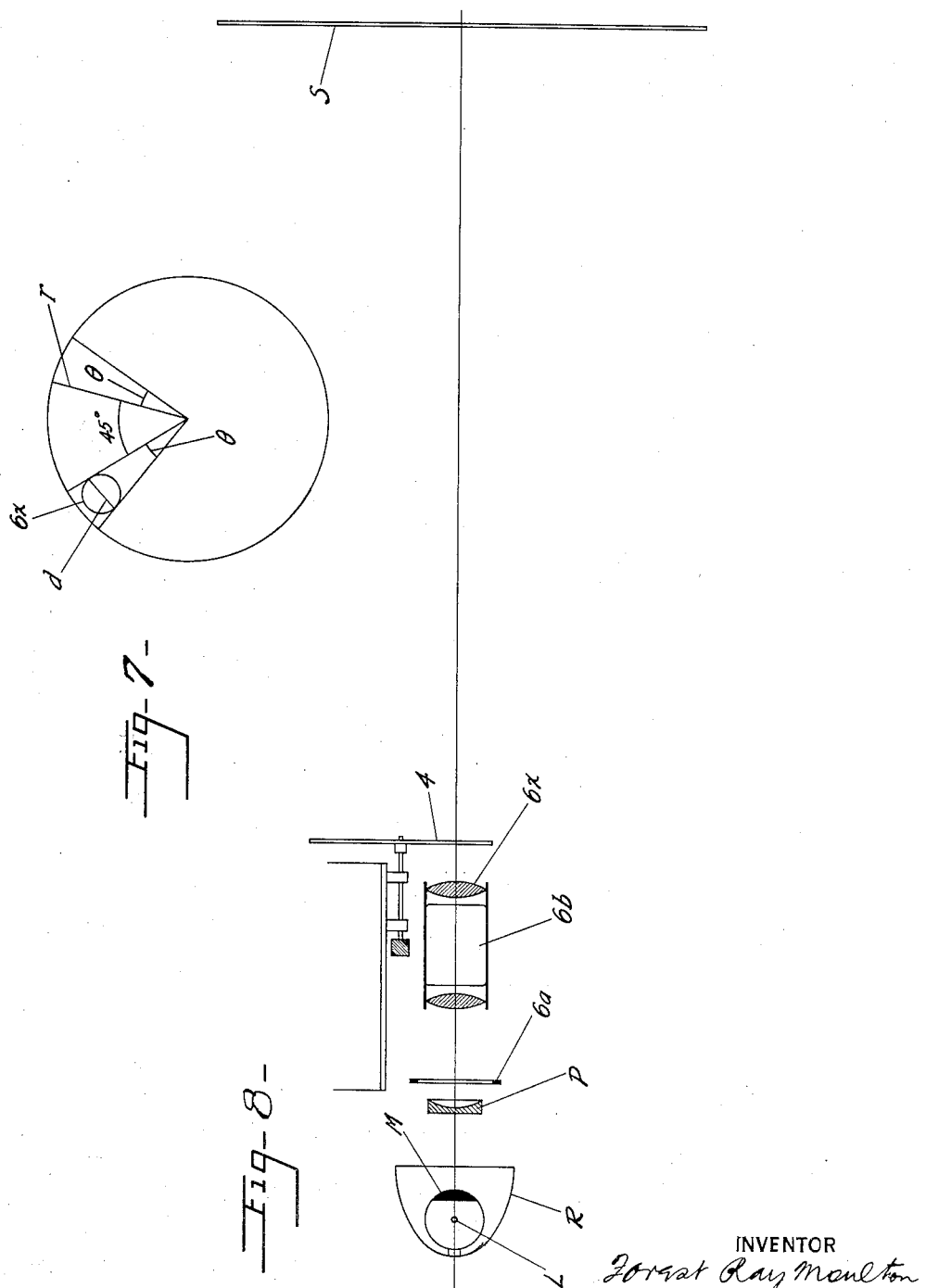

Patented Apr. 21, 1931

1,801,969

UNITED STATES PATENT OFFICE

FOREST RAY MOULTON, OF CHICAGO, ILLINOIS, ASSIGNOR, BY MESNE ASSIGNMENTS, TO ACME MOTION PICTURE PROJECTOR COMPANY, OF CHICAGO, ILLINOIS, A CORPORATION OF ILLINOIS

METHOD OF AND APPARATUS FOR KINETOSCOPY

Application filed January 7, 1920. Serial No. 350,036.

My present invention relates in general to such arts as kinetoscopy which employ intermittently moved devices, and more particulary apparatus utilizing an intermittent drive for causing certain parts thereof to come either into register or into predetermined relation in succession, and has special reference to the provision of an improved method of the character referred to which may be utilized for intermittently moving and acting upon a strip of relatively fragile material, such as for the successive projection upon a screen of the members of a series of pictures borne by a photographic film strip.

In accomplishing my improved (1) method for the projection of motion pictures, I employ certain novel apparatus utilizing markedly improved (2) light projection devices, (3) light interruption devices, (4) positioning mechanism for the moving material, and (5) intermittent motion devices combining them into an improved (6) motion picture projection machine, which embodies a number of features also of utility when incorporated in a (7) camera employed for the production of the pictures to be projected.

While mechanism of the character referred to finds a wide field of utility, it is especially useful for drawing the photographic film employed in motion picture apparatus step-by-step into position before a source of light and then effecting projection of the consecutive film portions upon the screen whereupon the pictures are displayed.

Inasmuch as I have illustrated my present invention as embodied in a motion picture projection machine, to-wit: in a machine employing a light element, an intermittent driving mechanism for attaining an improved intermittent motion of a motion picture film strip, and an improved positioning of the several pictures borne thereby, and an improved form of shutter for interrupting the projection of light rays through the film strip and upon the screen, I will premise that the film carries a series of pictures which are equally spaced and which are shown in succession; that there is a cycle corresponding to each picture on the film consisting of a short interval during which the film is moved into proper register with the opening in the frame arranged between the light source and projection lens, and another interval during which it is stationary and during at least part of which it is being projected onto a screen; that it is important in a machine of the character referred to not only that the step-by-step motion of the film be attained accurately but also that acceleration of such motion be uniform and smooth in order that the successive portions thereof projected upon the screen be so projected as to register upon the screen as perfectly as possible to the end that the picture shown may be clear; that such step-by-step movement of the film and the interposition of light-interrupting means (such as a revolving shutter) be so coordinated that the step-by-step motion of the film strip is effected during an eclipse of the light projection to the end that the bodily movement of the film strip may not be apparent to the spectators; and, furthermore, that it is most desirable that a high degree of illumination of the screen through the film and a minimum of vibration of the apparatus be attained, as well as that irregularity of motion or jerkiness be avoided and that the frequency of interruption of the light, and the ratio of intervals of light and dark be such that the optical effect known as "flickering" of the picture exhibited upon the screen may be avoided.

Motion picture projection machines known to me present certain feaures of mechanical difficulty, among which I may mention at this time the following, viz: one relating to the high temperatures incidental to the employment of high candle power light elements used for projection purposes, which temperatures require the use of an auxiliary shutter which is interposed between the source of light and the film strip save when the latter is moving rapidly; another relating to the driving of the film in such a manner and through as small a fraction of a cycle as may be attained so that the time during which the film must be eclipsed by the shutter may be abbreviated as much as possible, and that the motion of the film, when produced, may be produced with the use of a minimum of force so that the film may be subjected to a minimum of the strain and wear-and-tear which eventually, if it does not cause it to break, at least largely destroys its usefulness; and a further one relating to so proportioning the trajectory of the light interrupting elements across the cylinder of light rays passing through the projection lens, that is, the ratio between the diameter of the lens and the absolute width and number of the shutter blades, traversing it on the one hand, and on the other hand the ratio between the total of periods of light interruption and of light projection during each cycle of movement of the light interrupting means, that a high degree of illumination may be attained without the spectators becoming sensible of the lineal movement of the film strip.

The principal objects of my present invention, therefore, involve in addition to the provision of an improved method of and apparatus for kinetoscopy, the provision of an improved projection light whereby a high effective candle power may be attained at relatively low temperatures; the provision of an improved intermittent motion device characterized by the application of a minimum of force to the object actuated, one of relatively low maximum speed in attaining a given objective in a given time, one wherein the motion effected can be effected in as small a fraction of a cycle as may be desired, one which is smooth in operation, one which is adapted to bring certain parts of the material actuated into predetermined registry with given points, and one which is susceptible of ready synchronization with associated parts of the mechanism; the provision of an improved light interrupting means; together with such further and additional objects as may hereinafter appear.

In attaining the objects referred to, and such further benefits and advantages as may be hereinafter pointed out, I have provided a mechanism, one embodiment of which is illustrated in the accompanying drawings, wherein—

Figure 1 is a side elevational view of part of a motion picture projection machine embodying my present invention;

Figure 2 is a top plan view of the machine of Figure 1;

Figure 3 is a diagrammatic view illustrative of the operation of certain of the parts shown in Figure 1;

Figures 4 and 5 are diagrams employed to explain the theory of form and operation of the device of Figure 3;

Figure 6 is an enlarged end elevation of the light interrupting device shown in plan view in Figure 2;

Figure 7 is a diagram employed to explain the theory of form and operation of the device of Figure 6;

Figure 8 is a schematic view illustrative of the spatial relation of the projection light to the film, the barrel of the focusing lens structure, the light interrupting device, and the screen.

In order that the nature of my invention as applied to a motion picture projection machine may be clearly understood, I will further premise (a) a typical motion picture machine employing in general the practice which is at present approved, and (b) what are considered the essential features of the intermittent driving mechanism and the framing mechanism employed therein.

A typical motion picture projection machine includes a double sprocket 1, driven at a uniform speed, which by virtue of its teeth engaging marginal perforations on both edges of the film, A, draws such film from a holding reel (not shown) and delivers it in position to be passed through the machine, that is, before the projecting light L. There is also employed a double sprocket 2 which is driven intermittently by suitable mechanism. This mechanism usually includes a "star wheel" of the general form of the Geneva cross, such as is indicated at 3x in Figure 4, having either three or four slots, wherein each of the slots has parallel sides. In machines employing my present invention in its preferred form, however, I employ an improved form of "star wheel", such as is indicated at 3, (Figure 2) wherein the wheel is of the general contour of a cross of the type known frequently as a Maltese cross and specifically as "croix pattée" wherein the slots 3b are curved as perhaps most clearly to be seen in Figure 3.

A revolving shutter structure 4 is interposed between that part of the film which passes in front of the projection light and the screen, S. The intermittent motion device, just referred to, is so driven and so related to the shutter 4 that the portion of the film which is exposed to the light, and which is projected on the screen, is stationary while the shutter 4 is "open" and is moved only while the shutter is "closed." A third sprocket 5, driven at a uniform speed, is commonly employed to deliver the film, as it passes through the machine, after projection upon the screen, to a winding up-reel (not shown).

The several double sprockets, 1, 2 and 5, are provided with teeth normally about one-sixth of an inch apart which engage in corresponding perforations adjacent to the margins of the film. The vertical width of each picture on the film is about three-quarters of an inch and consequently there are a number of such marginal perforations, on each edge of the film, corresponding to each picture thereon.

It will, of course, be understood on reference to Figure 2 of the drawing, that for driving the mechanism here illustrated, I may employ a belt, 30, for rotating a pulley, 31, mounted on a main drive shaft, 32, which carries a drive wheel, 33, provided with a stud, 34, for imparting motion to the star wheel, 3; a pinion, 35, for driving the gear, 36, mounted on the shaft, 37, which carries at the opposite end the sprocket 5; and a pinion, 38, which meshes with a pinion, 39, on the shaft, 40, which carries the shutter, 4.

Referring now more particularly to the form of star wheel, 3, employed by me for intermittently driving the pinion, 2, such star wheel being shown in the full lines in Figure 3, and with particular reference to Figures 3 to 5 of the drawings, it should be borne in mind that the film carries a series of equally spaced pictures which are shown in succession, and that there is a time cycle, corresponding to each picture on the film, consisting of a relatively short interval, during which the film is moved, and a relatively long interval, during which it is stationary.

In order that the nature of my improved star wheel, 3, may be more fully understood, I deem it proper to analyze the dynamics of the conventional star wheel of the Geneva cross form, such as is shown at $3x$ in Figure 4, in order that the precise action thereof may be comprehended and that it may be clear what the imperfections are that I undertake to overcome by my invention viewed from another aspect.

As will be understood on reference to Figures 1 and 2 of the drawings, the film is moved through the medium of a train of gearing, including a shaft, 7 upon which the star wheel 3 is non-rotatably mounted, and that said star wheel is driven by a uniformly rotating driving element, 33, and that the force exerted on the film A by the sprocket 2 is directly proportional to the angular acceleration of the star wheel, as in cases where a Geneva cross form wheel, such as is indicated at $3x$, is employed since the linear acceleration of the film, which is proportional to the force, is proportional to the angular acceleration of the sprocket.

The radii of the wheel, $3x$, and the driver, $33x$, as here shown, are the same, and the stud, $34x$, enters the slot $3a$ on a tangent and consequently imparts no sudden impulse or jerk to the wheel $3x$.

Referring now, more particularly, to Figure 4 of the drawing, let $r$ represent the distance from the center of the star wheel $3x$ to the stud $34x$; let R represent the radius of the driver $33x$; let D represent a line joining the centers of the star wheel $3x$ and the driver $33x$; let $\theta$ represent the angle between R and D, and let $\phi$ represent the angle between $r$ and D.

Then it follows that—

$$(1) \quad \begin{cases} r^2 = D^2 + R^2 - 2DR \cos \theta \\ \sin \phi = \dfrac{R}{r} \sin \theta \end{cases}$$

Since the driver $33x$ is rotated at uniform velocity, it follows that—

$$(2) \quad \theta = 45° - ct$$

and the units may be so chosen that $c=1$.

On taking the first derivative of the foregoing equations at (1), it is found that—

$$(3) \quad \begin{cases} \dfrac{dr}{dt} = \dfrac{DR}{r} \sin \theta \\ \cos \phi \dfrac{d\phi}{dt} = -\dfrac{R}{r^2} \dfrac{dr}{dt} \sin \theta + \dfrac{R}{r} \cos \theta \\ \qquad = -\dfrac{DR}{r^2} \sin \phi \sin \theta + \dfrac{R}{r} \cos \theta \end{cases}$$

Then, on taking the derivative of the second of these expressions, it follows that—

$$(4) \quad \begin{cases} \cos \phi \dfrac{d^2\phi}{dt^2} = \sin \phi \left(\dfrac{d\phi}{dt}\right)^2 + \dfrac{2D^2R}{r^3} \sin^2 \phi \sin \theta \\ -\dfrac{DR}{r^2} \cos \phi \sin \theta \dfrac{d\phi}{dt} - \dfrac{2DR}{r^2} \sin \phi \cos \theta \\ - \sin \phi \\ = f_1 + f_2 - f_3 - f_4 - \sin \phi \end{cases}$$

where $$\begin{cases} f_1 = \sin \phi \left(\dfrac{d\phi}{dt}\right)^2 \\ f_2 = \dfrac{2D^2R}{r^3} \sin^2 \phi \sin \theta \\ f_3 = \dfrac{DR}{r^2} \cos \phi \sin \theta \dfrac{d\phi}{dt} \\ f_4 = \dfrac{2DR}{r^2} \sin \phi \cos \theta \end{cases}$$

From this expression the second derivative $\dfrac{d^2\phi}{dt^2}$, to which the force exerted by the sprocket 2 on the film strip A is proportional, can be computed.

Figure 5 shows the manner in which the force varies while the Geneva star wheel $3x$ is being turned 90°. The ordinate of the curve is proportional to the force. It follows from the figure that the force is a minimum at the start and arises to a maximum which is at least twice the minimum.

If a constant force were used it would be sufficient for it to be only 46% of the maximum force required by the Geneva star wheel $3x$. The serious defects of the Geneva star wheel $3x$ are, therefore, that when it is used, the film is always in motion as much as one-quarter of a cycle and the maximum force, which has a tendency to tear the film, is more than twice as great as is necessary.

By the employment of the improved form of star wheel of my present invention, the motion can be made in as small a fraction of the whole cycle as may be desired and the force applied on the film is constant, and, therefore, it is the minimum force which can move the film the required distance in the required time. One advantage of having the film moved during only a small fraction of a cycle is that it is then necessary to have the light eclipsed only a small fraction of a cycle. This makes it possible to project more light onto the screen and to reduce correspondingly (1) the candle power of the source, (2) the heat in the machine, and (3) the heat on the film while it is being exposed. When the motion takes place in one-eighth of a cycle, for example, the efficiency of the light is twice that when a Geneva form star wheel is used. A second and paramount advantage is that when the film is moved during only one-twelfth of a cycle it is feasible and I have found it desirable to use a shutter with a plurality of, say four, blades, thus producing such frequent interruptions of the light that the appearance of flickering, which is now present in all pictures produced by motion picture projection is absolutely and completely eliminated from the field of visibility.

In Figure 3 the driver, 33, and the star wheel, 3, are shown in the positions and proportions employed when the film is to be moved in only one-eighth of a cycle, or half that required by the typical and customary Geneva star wheel, such as is shown in Figure 4. In all cases the slots, $3b$, are so designed that the stud, 34, exerts a constant actuating pressure on the edge 41 of the slot $3b$ during the first half of the motion of the star wheel 3, and then constant substantially equal restraining pressure in the opposite direction on the edge 42 of such slot during the second half of such motion. The contours of the curves used in forming the slots are so designed that the aforementioned results will be secured. The theory of their design is as follows:

Since the driver turns at a constant angular speed, the angle $\theta$ is defined by (6) $\quad \theta = \Theta - at,$ where $\Theta$ is the value of $\theta$ when the stud 34 first enters the slot $3a$, and depends upon the fraction of a cycle the film is in motion. If $\frac{1}{n}$ is the fraction of a cycle the film is in motion, then—

(7) $\quad \Theta = \dfrac{180°}{n}$

The units may be so chosen that $a=1$.

For example, if the angle $\Theta$ changes from $\Theta = 22.5$ to $0$ in $\dfrac{1}{128}$ of a second, and if $a=1$, then the unit of time to make $at=22.5$ for $t = \dfrac{1}{128}$ is $\dfrac{1}{22.5 \times 128} = \dfrac{1}{2880}$ of a second.

Let $\rho$ be a line fixed in the star-wheel 3 and let $\infty$ be the angle between $\rho$ and D. Then, since the angular acceleration of the star wheel 3 must be constant in order that the sprocket 2 shall exert a constant force on the film A during its motion, it follows that $\infty$ is defined by (8) $\quad \infty = 45° - \tfrac{1}{2} bt^2$ The constant $b$ is determined by the condition that $\theta$ and $\infty$ shall vanish simultaneously. For example, if the motion of the film is to take place in one-eighth of a cycle, then it follows from (7) just stated, that $\Theta = 22.5°$, and from (6) just stated, that $\theta = 0$ for $t = 22.5$; and then from (8) just stated, by the condition that $\theta$ and $\infty$ shall vanish simultaneously, that $b = 8/45$.

Again, let $r$ represent the distance from the center of the star-wheel 3 to the stud 4 while it is in the slot $3a$, and let $\phi$ represent the angle between $r$ and the line D joining the centers of the driver 33 and the star wheel 3. Then $r$ and $\phi$ are defined in terms of R, D, and $\theta$ by (9) $\quad \begin{cases} r = \sqrt{R^2 + D^2 - 2RD \cos \theta}, \\ \sin \phi = \dfrac{R}{r} \sin \theta \end{cases}$ These equations give points on the curves described by the center of the stud 4 in its motion in the slot $3a$ for every value of $\theta$.

The rectangular coordinates of the curve referred to fixed axes are defined by

(10) $\quad \begin{cases} x = r \cos \psi \\ y = r \sin \psi \\ \psi = \phi - \infty \end{cases}$ where the origin is at the center of the star wheel 3 and the $x$-axis goes from the center of the star wheel 3 down the central line of the slot $3a$, and the $y$-axis is at right angles to the $x$-axis. The following tables give the coordinates of the line described by the center of the stud 4 in the slot $3a$ when $D = 3''$ for cases where the intervals during which the film is moving are $\frac{1}{8}$, $\frac{1}{10}$ and $\frac{1}{12}$ of a cycle.

Ratio 8 to 1
Distance between centers = 3″
Radius of driver = 2.2961
Radius of star = 1.2426

$x=1.2426,\ 1.1693,\ 1.0981,\ 1.0299,\ 0.9654,\ 0.9055,$
$y=0.0000,\ 0.0247,\ 0.0392,\ 0.0460,\ 0.0475,\ 0.0454,$ $x=0.8511,\ 0.8034,\ 0.7636,\ 0.7330,\ 0.7130,\ 0.7043$
$y=0.0415,\ 0.0367,\ 0.0315,\ 0.0254,\ 0.0171,\ 0.0043$

Ratio 10 to 1
Distance between centers = 3″
Radius of driver = 2.3808
Radius of star = 1.0405

$x=1.0404,\ 0.9674,\ 0.8976,\ 0.8324,\ 0.7731$
$y=0.0000,\ 0.0296,\ 0.0458,\ 0.0523,\ 0.0522$ $x=0.7212,\ 0.6782,\ 0.6458,\ 0.6259,\ 0.6192$
$y=0.0482,\ 0.0416,\ 0.0327,\ 0.0199,\ 0.0000$

Ratio 12 to 1
Distance between centers = 3″
Radius of driver = 2.4495
Radius of star = .8966

$x=0.8966,\ 0.8238,\ 0.7555,\ 0.6936,\ 0.6404$
$y=0.0000,\ 0.0326,\ 0.0485,\ 0.0531,\ 0.0505$ $x=0.5976,\ 0.5676,\ 0.5524,\ 0.5505$
$y=0.0431,\ 0.0314,\ 0.0131,\ 0.0000$

The preceding theory gives the path of the center of the projection, 34. Since the projection 34 must be of finite dimensions, it is necessary to compute the curve on which its surface must act in producing the motion referred to. This curve must be parallel to the curve described by the center and at a perpendicular distance from it equal to the radius of the projection 34.

The equation of a curve of the second degree through three successive points of the path of the center is, in parametric form, $$(11) \begin{cases} x = \frac{(t-t_2)(t-t_3)}{(t_1-t_2)(t_1-t_3)}x_1 + \frac{(t-t_1)(t-t_3)}{(t_2-t_1)(t_2-t_3)}x_2 + \frac{(t-t_1)(t-t_2)}{(t_3-t_1)(t_3-t_2)}x_3, \\ y = \frac{(t-t_2)(t-t_3)}{(t_1-t_2)(t_1-t_3)}y_1 + \frac{(t-t_1)(t-t_3)}{(t_2-t_1)(t_2-t_3)}y_2 + \frac{(t-t_1)(t-t_2)}{(t_3-t_1)(t_3-t_2)}y_3, \end{cases}$$

where $t_1$, $t_2$, and $t_3$ are three values for which the position of the projection 34 has been computed and where $x_1$, $x_2$, and $x_3$ are its three abscissas, and $y_1$, $y_2$, and $y_3$ its three ordinates. The equation of the perpendicular to this curve through the point $x_2 y_2$ is $$(12)\quad y - y_2 = -m\,(x - x_2)$$

where $$(13)\quad m = \frac{\left(\frac{dx}{dt}\right)_2}{\left(\frac{dy}{dt}\right)_2} = \frac{\frac{t_2-t_3}{(t_1-t_2)(t_1-t_3)}x_1 + \frac{2t_2-t_1-t_3}{(t_2-t_1)(t_2-t_3)}x_2 + \frac{t_2-t_1}{(t_3-t_1)(t_3-t_2)}x_3}{\frac{t_2-t_3}{(t_1-t_2)(t_1-t_3)}y_1 + \frac{2t_2-t_1-t_3}{(t_2-t_1)(t_2-t_3)}y_2 + \frac{t_2-t_1}{(t_3-t_1)(t_3-t_2)}y_3}$$

Let $d$ represent the radius of the projection 34. Then the coordinates of the corresponding point on the curve described by the outside of the projection 34 are $$(14)\quad \begin{cases} x'_2 = x_2 + d\dfrac{1}{\sqrt{1+m^2}} \\ y'_2 = y_2 + d\dfrac{1}{\sqrt{1+m^2}} \end{cases}$$

It is desirable to have points on the curve described by the outer surface of the projection 34 corresponding to equal intervals on the $x$-axis (see Figure 3). Let $x_0$ be a value of $x$, and $y_0$ the corresponding value of $y$ on the curve described by the margin of the projection 34. It is required to find $y_0$ in terms of $x_0$ from the coordinates of the curve which are given by equations (14) above. If $(x'_1, y'_1)$ and $(x'_2, y'_2)$ are two points on the curve described by the surface of the projection 34, then $y_0$ corresponding to $x_0$ is given by $$(15)\quad y_0 = y'_1 + \frac{x'_1 - x_0}{x'_1 - x'_2}\{y'_2 - y_1\}$$

By means of these several equations final points on the curve described by the margin of the projection 34, corresponding to equal intervals of $x$ can be computed.

The final results in three cases are contained in the following tables:

Ratio 8 to 1
$x=1.2500,\ 1.2000,\ 1.1500,\ 1.1000,\ 1.0500,\ 1.0000,\ .9500$
$y=\ .0976,\ .1135,\ .1253,\ .1336,\ .1386,\ .1410,\ .1410$ $x=\ .9000,\ .8500,\ .8000,\ .7500,\ .7000,\ .6500,$
$y=\ .1390,\ .1355,\ .1307,\ .1243,\ .1134,\ .0866,$

Ratio 10 to 1
$x=1.0500,\ 1.0000,\ .9500,\ .9000,\ .8500,\ .8000,\ .7500,$
$y=\ .0990,\ .1176,\ .1312,\ .1402,\ .1452,\ .1466,\ .1449,$ $x=\ .7000,\ .6500,\ .6000,\ .5500$
$y=\ .1401,\ .1321,\ .1148,\ .0748$

Ratio 12 to 1
$x=.9000,\ .8500,\ .8000,\ .7500,\ .7000,\ .6500,\ .6000,$
$y=.1033,\ .1226,\ .1358,\ .1437,\ .1468,\ .1455,\ .1394,$ $x=.5500,\ .5000$
$y=.1264,\ .0975$ In order that the nature of my improved light interruption element may be more fully understood, I further deem it proper to analyze the construction and operation of the ordinary revolving shutter provided with two or three blades and commonly used at this time in motion picture projection machine practice.

Referring now more particularly to Figures 6 to 8 of the drawings, it is assumed (1) that the shutter structure, 4, rotates once in a cycle of the operation of the intermittent driving mechanism, above referred to. It, therefore, follows that (2) the time of motion is $$\frac{1}{n}$$

of a cycle; (3) the angular distance the shutter rotates while the film is moving is $$\frac{360°}{n}$$

whatever the radius $r$ of the shutter blade may be; (4) the shutter blade must be at least $$\frac{360°}{n}$$

wide; (5) the cylinder of rays from the projection lens, $6x$, has the diameter $d$ and consequently the light is not entirely cut off from the screen until the shutter is moved the linear distance $d$ across the cylinder of rays; (6) if the radius of the shutter is $r$, then to cut off the cylinder of rays completely, during the movement of the intermittent motion device, the shutter blade must rotate through the angle $\theta$ which is defined by $$\sin \theta = \frac{d}{2r-d};$$

(7) the width of the shutter blade, which is necessary to interrupt the cylinder of rays the entire time during which the film is in motion, is, therefore, according to the formula—

$$\frac{360°}{n} + 2\theta$$

When no "stealing" is effected, that is when the shutter blade 4, is not narrowed (as shown in Figure 6,) and when reliance is not placed upon the relative slowness of the human eye to accommodate itself to changes in moving pictures, due to the persistence, for a certain length of time, of images upon the retina before they fade and may be replaced by others, then applying the said formula in the case of a well known projection apparatus having $d=1\frac{21}{32}''$, and $r=2\frac{3}{4}''$ and a 4 to 1 ratio of movement of the star wheel, $3x$, the following width of shutter blade is found to be requisite—

(1) $\quad \frac{360°}{4} + 2\theta = 90 + 102 = 192°.$

But in structures embodying my present invention, wherein $d$ has the same value of $1\frac{21}{32}''$ as above, but $r=4\frac{3}{4}''$, with ratios of movement of the star wheel of 8 to 1, and 12 to 1, respectively, and $\theta'$ is defined by $$\sin \theta' = \frac{d}{2r'-d}$$

the following results are attained:

(2) $\quad \frac{360°}{8} + 2\theta = 45 + 48 = 93°$ (3) $\quad \frac{360°}{12} + 2\theta = 30 + 48 = 78°$ In the case of (1) just mentioned, since each of the two blades must be 192° wide, there can be no illumination, so in order to attain any illumination marked "stealing" is always effected.

Comparably with the foregoing, in a machine embodying my present improvements, since each of the two blades has a width of only 93°, making a total of but 186° of darkness and 222° of light per cycle, in the case (2) just mentioned, I am able to attain a percentage of illumination of 48, and a percentage of 57 in the last mentioned case (3). Furthermore, when employing three shutter blades (without "stealing") I am able to obtain a light percentage of 22 and 35, respectively, as against 0% (total darkness) where the usual structure is employed without "stealing".

The great advantage of the employment of an intermittent machine device, which is in operation but a small part of a cycle, and of a light interruption device co-ordinated therewith according to such high ratios, and one having a relatively long radius, (such as are embodied in my present invention) is quite apparent from the following table wherein I have set down in parallel columns the percentages of illumination attained by a star wheel employing the 4 to 1 ratio and the relatively short shutter radius of the prior art, and by star wheels employing the 8 to 1 and 12 to 1 ratios and the relatively long shutter radius of my present invention.

| | 4 to 1 | 8 to 1 | 12 to 1 |
|---|---|---|---|
| "A"—2 blades stealing on none | —0 | 48 | 57 |
| "B"—3 blades stealing on none | —0 | 22 | 35 |
| "C"—2 blades stealing on one (2nd) | 22 | 62 | 70 |
| "D"—3 blades stealing on two (2nd and 3rd) | —0 | 49 | 62 |
| "E"—2 blades stealing on two (both) | 50 | 75 | 82.5 |
| "F"—3 blades stealing on three (all) | 25 | 62 | 75 |
| "G"—4 blades stealing on none | —0 | —0 | 13 |
| "H"—4 blades stealing on three (2nd, 3rd and 4th) | —0 | 37 | 53 |
| "I"—4 blades stealing on four (all) | —0 | 50 | 67 |
| "K"—5 blades stealing on four (2nd, 3rd, 4th and 5th) | —0 | 24 | 45 |

From the foregoing table, it will be apparent that by the use of my present improvements I am able to attain with a shutter having two blades, but without any "stealing" whatever a percentage of illumination (48%) almost as great as the optimum (50%) that is attainable with any prior procedure known to me; that under the stated conditions wherein I am able to attain such illumination, the projection light, according to prior procedure, would be totally eclipsed; that under the conditions where such optimum is attained in prior procedure, I am able to attain with the 8 to 1 ratio half again as much, or with a 12 to 1 ratio even three-fifths more illumination, since the light is uninterrupted from but 25% of the cycle of movement in the one case and 17½% thereof in the other case; that I am able to attain from two and one-half to three times as much illumination as has been heretofore attainable with the use of a three-blade shutter; and, furthermore, that I have not only been able to employ for the first time in this art a four-blade shutter but even to attain a high percentage of illumination therewith.

It will also be apparent that one of the great advantages of my present invention is involved in the employment of relatively high ratios of star wheel movement and picture positioning, since such not only permit a total interruption of the projection light for the positioning of a picture, and the effecting of such positioning in less time (to-wit: in 1/100 of a second or less) than has heretofore been done, in the case of pictures moved seriatim at a normal rate of say, 16 per second, but also enable me to effect a greater number of interruptions of the projection of each picture, to-wit: four or more. For example: with a 12 to 1 ratio, using five blades and not "stealing" on primary blade, that is, the one which eclipses the projection light while the picture is in motion, I am able to effect five interruptions per picture and attain a percentage of illumination of 45.

It has been ascertained from experience that in order to avoid the appearance of jerkiness in the moving picture display upon a screen by motion picture projection, that the picture must generally be projected seriatim upon the screen at the rate of not less than approximately sixteen per second, and I have ascertained that a frequency of alternation of projection and of interruption of projection of an average of more than three of such alternations per picture, and consequently of more than forty-eight per second, is desirable in order to avoid flickering. While the required number of such alternations per second is not constant, inasmuch as it depends upon at least two variable factors, viz: (1) the number of pictures projected per second, and (2) the degree of illumination of the film strip, I have found that very good results, both in stability of illumination and in intensity are attained by effecting the number of such alternations in a proportion of substantially four thereof per cycle of the picture positioning, and I, therefore, prefer to utilize a four-blade shutter structure, wherein the open parts of the shutter are substantially of the same width, and the closed portions thereof are preferably all of the same width, but may be somewhat narrower than the open portions, the moving of the film strip taking place while one blade is traversing the cylinder of light emitted from the focusing lens structure 6b.

From the foregoing description, it will be apparent that by means of the employment of the novel elements and combinations provided by me, I have attained certain features of marked importance and advantage including means for utilizing all of the rays emanating from the light source in such a manner as to greatly reduce the candle power required for the illumination of the film strip and thereby reduce the incidental heat accompanying the projection of motion pictures, and in such a manner as to obviate the use of a condenser; means for so effecting the intermittent or step-by-step motion of the film strip whereby the picture may be projected seriatim that each increment thereof may not only be attained in a shorter interval but more smoothly and with less strain upon the film strip; and means for intermittently interrupting the projection of light having such a co-operative relation to the intermittent motion mechanism and to the focusing lens structure that substantially isochronous alternations of light and shade upon the screen may be effected with great rapidity; that such may be accomplished while at the same time the projection is interrupted during the entire time the film strip is in motion, and that the illumination of the picture upon the screen is not only not simultaneously decreased but is substantially increased.

Furthermore, it will be understood that I have combined and co-ordinated the several novel and useful features of construction and provided new modes of operation thereof whereby I have attained a new and improved method of motion picture projection characterized by substantial immobility of the position of picture upon the screen, a higher degree of illumination thereof than has heretofore been possible, and a total elimination of that appreciable and objectionable variation of light and shade, or of intensity of light projected upon the screen, which is known as flickering.

Other advantages of my present invention will be appreciated by those who are skilled in the art to which it pertains.

Having thus described my invention and illustrated its use, what I claim as new and desire to secure by Letters Patent is—

1. In an apparatus of the character referred to, in combination, a frame for a strip of movable material, having an aperture for disclosing a portion of such strip, and means for moving the material step-by-step into register with said aperture including a driver provided with a projection, a star wheel provided with a slot adapted to receive said projection, said slot being provided with a bearing surface which is continuously curved and adapted to be in continuous contact with said projection while in said slot to receive and transmit a uniform rate of movement from said projection to said moving means throughout contact of the projection and slot.

2. In an apparatus of the character referred to, in combination, a frame for a strip of movable material, having an aperture for disclosing a portion of such strip, and means for moving the material step-by-step into register with said aperture including a driver provided with a projection, a star wheel provided with a slot adapted to receive said projection, said slot being provided with oppositely disposed bearing surfaces which are continuously curved and adapted to be in continuous contact with said projection while in said slot to receive and transmit a uniform rate of movement from said projection to said moving means throughout contact of the projection and slot.

3. In an apparatus of the character referred to, in combination, a frame for a strip of movable material, having an aperture for disclosing a portion of such strip, and means for moving the material step-by-step into register with said aperture including a driver provided with a projection, a star wheel provided with a slot adapted to receive said projection, said slot being provided with oppositely disposed bearing surfaces which are continuously curved and adapted to continuously contact with said projection in motion to receive and transmit a uniform rate of movement from said projection to said moving means, said star wheel being of a general form of a croix pattée.

4. An intermittent motion device comprising a revoluble driver provided with a projection, a star wheel adapted to receive said projection and provided with a slot having a bearing surface which is continuously curved and adapted throughout a cycle of movement to continuously contact with and to be in continuous contact with said projection while in said slot to receive and transmit a uniform rate of movement from said projection to an element to be driven.

5. An intermittent motion device comprising a revoluble driver provided with a projection, a star wheel adapted to receive said projection and provided with a slot having oppositely disposed bearing surfaces which are continuously curved and adapted throughout a cycle of movement to continuously contact with and to be in continuous contact with said projection while in said slot to receive and transmit a uniform rate of movement from said projection to an element to be driven.

6. An intermittent motion device comprising a revoluble driver provided with a projection, a star wheel adapted to receive said projection and provided with a slot having oppositely disposed bearing surfaces which are continuously curved and adapted to be in continuous contact with said projection while in said slot to receive and transmit a uniform rate of movement from said projection to an element to be driven, said star wheel being of a general form of a croix pattée.

7. An intermittent motion device comprising a revoluble driver provided with a projection, a star wheel adapted to receive said projection and provided with a plurality of slots adapted to receive said projection and having each a bearing surface which is continuously curved and adapted throughout a cycle of movement to continuously contact with said projection and to be in continuous contact with said projection while in said slots to receive and transmit a uniform rate of movement from said projection to an element to be driven.

8. An intermittent motion device comprising a revoluble driver provided with a projection, a star wheel adapted to receive said projection and provided with a plurality of slots adapted to receive said projection and having each bearing surfaces which are continuously curved and adapted throughout a cycle of movement to continuously contact with said projection and to be in continuous contact with said projection while in said slots to receive and transmit a uniform rate of movement from said projection to an element to be driven.

9. In an apparatus of the character referred to, in combination, a frame for a strip of movable material, having an aperture for disclosing a portion of such strip, and means for moving the material step-by-step into register with said aperture including a driver provided with a projection, a star wheel provided with a slot greater in width at its medial portion than at its extremities and adapted to receive said projection, said slot being provided with a bearing surface which is continuously curved and adapted to be in continuous contact with said projection while in said slot to receive and transmit a uniform rate of movement from said projection to said moving means.

10. In an apparatus of the character referred to, in combination, a frame for a strip of movable material, having an aperture for disclosing a portion of such strip, and means for moving the material step-by-step into register with said aperture including a driver provided with a projection, a star wheel provided with a slot greater in width at its medial portion than at its extremities and adapted to receive said projection, said slot being provided with oppositely disposed bearing surfaces which are continuously curved and adapted to contact with and to be in continuous contact with said projection while in said slot to receive and transmit a uniform rate of movement from said projection to said moving means.

11. In an apparatus of the character referred to, in combination, a frame for a strip of movable material, having an aperture for disclosing a portion of such strip, and means for moving the material step-by-step into register with said aperture including a driver provided with a projection, a star wheel provided with a slot greater in width at its medial portion than at its extremities, and adapted to receive said projection, said slot being provided with oppositely disposed bearing surfaces which are continuously curved and adapted to be in continuous contact with said projection while in said slot to receive and transmit a uniform rate of movement from said projection to said moving means, said star wheel being of a general form of a croix pattée.

In testimony whereof I have hereunto signed my name.

FOREST RAY MOULTON.